United States Patent [19]

Hüllen et al.

[11] 4,349,368

[45] Sep. 14, 1982

[54] GLASSWARE-MAKING APPARATUS WITH REJECT-CATCHING CHUTE AND METHOD OF OPERATING THE APPARATUS

[75] Inventors: Helmut Hüllen; Werner-Dieter Knoth, both of Essen, Fed. Rep. of Germany

[73] Assignee: Veba Glas A.G., Essen, Fed. Rep. of Germany

[21] Appl. No.: 266,301

[22] Filed: May 22, 1981

[30] Foreign Application Priority Data

May 24, 1980 [DE] Fed. Rep. of Germany ....... 3020042

[51] Int. Cl.$^3$ ............................................. C03B 9/195
[52] U.S. Cl. ......................................... 65/28; 65/158; 65/159; 65/165
[58] Field of Search .................... 65/165, 158, 28, 159

[56] References Cited

U.S. PATENT DOCUMENTS

| | | | |
|---|---|---|---|
| 1,352,396 | 9/1920 | Bailey | 65/165 X |
| 2,682,802 | 7/1954 | Fedorchak et al. | 65/158 X |
| 2,915,638 | 12/1959 | Poole | 65/158 |

*Primary Examiner*—Arthur D. Kellogg
*Attorney, Agent, or Firm*—Karl F. Ross

[57] ABSTRACT

A glassware-making apparatus has a premold adapted to make a parison and a final mold spaced from the premold and adapted to receive and blow-mold the parison. An arm removes the parison from the premold and displaces it along a path to the final mold. A scrap chute can be displaced by a controller into a position intercepting this path to catch the parison and divert it to a recycle/scrap bin when the controller detects a malfunction at the final mold or downstream therefrom.

10 Claims, 2 Drawing Figures

GLASSWARE-MAKING APPARATUS WITH REJECT-CATCHING CHUTE AND METHOD OF OPERATING THE APPARATUS

FIELD OF THE INVENTION

The present invention relates to an apparatus for making hollow glassware and to a method of operating this apparatus.

BACKGROUND OF THE INVENTION

Hollow glassware is made by forming a gob of molten glass in a hot premold into a so-called parison that is subsequently shaped in one or more final molds into the finished article of hollow glassware. Normally, as described in commonly owned patent application Ser. Nos. 096,744 and 214,699 filed respectively Nov. 23, 1979 and Dec. 9, 1980, the parison is transported by a transporter arm which grips it around its neck and swings it through an arc to deliver it to the final mold.

In such a glassware-making process it is essential that the various steps take place in a fairly rapid sequence, with minimal time between successive steps. No cooling of the workpiece or molds can be permitted, or a spoiled article will surely result.

Thus with these manufacturing systems if there is a breakdown somewhere along the production line, it is normally necessary to shut down the whole line while the problem is eliminated. Subsequently the first few articles that are produced must invariably be scrapped, as the molds do not operate well unless they are hot, and they normally get their heat from the workpieces.

OBJECTS OF THE INVENTION

It is therefore an object of the instant invention to provide an improved glassware-making apparatus and method of operating same.

Another object is the provision of such an improved method and apparatus wherein a breakdown somewhere along the production line can be attended to without shutting down the equipment upstream and without substantial lost production after the system is started up again.

SUMMARY OF THE INVENTION

These objects are attained according to the instant invention in an apparatus having a premold adapted to make a parison, a final mold spaced from the premold and adapted to receive and blow-mold the parison, and means including an arm for removing the parison from the premold in a pickup position and displacing the removed parison along a path through an intermediate position in the air to a release position at the final mold. According to the invention means is provided including a scrap chute displaceable into a position along the path for intercepting the parison and receiving same from the arm. More particularly, when a breakdown occurs at or upstream of the final mold, the scrap chute is moved into position in the downwardly concave arcuate path extending from the premold to the final mold. The arm is arrested and releases the parison shortly before it arrives at the chute to project the parison into the chute.

Thus with the system according to the instant invention the upstream equipment will continue to function if there is a breakdown at or downstream of the final mold. The parisons produced at the premold will, admittedly, have to be scrapped, but this has been found to represent only a minor cost compared to the waste normally incurred when the whole production line must be shut down, especially as the scrapped parisons can easily be melted and their glass reused. When the system is started up again all of the equipment upstream of the final mold is still at normal production temperature, so that, since the equipment downstream of the premold normally is not maintained as hot as the upstream equipment, the production line can immediately start making usable glassware again. The first few items of production need not be discarded.

According to another feature of this invention the chute is moved into position at the start of a production run and is only moved out of the way when the parisons are of nominal quality. In this manner the problems frequently caused by feeding parisons of too low a temperature or otherwise inferior quality to the final mold from the premold are avoided.

An appropriate controller operates the interception chute according to this invention, moving it into the intercept position whenever it senses any disturbance in production downstream from it. The controller may also detect the presence of a person near the machine and move the interception arm into the intercept position whenever someone is nearby, in order to shield such person from injury from the hot glass. Such a controller can operate electrically, electronically, pneumatically, and/or hydraulically.

SPECIFIC DESCRIPTION

Figure 1:
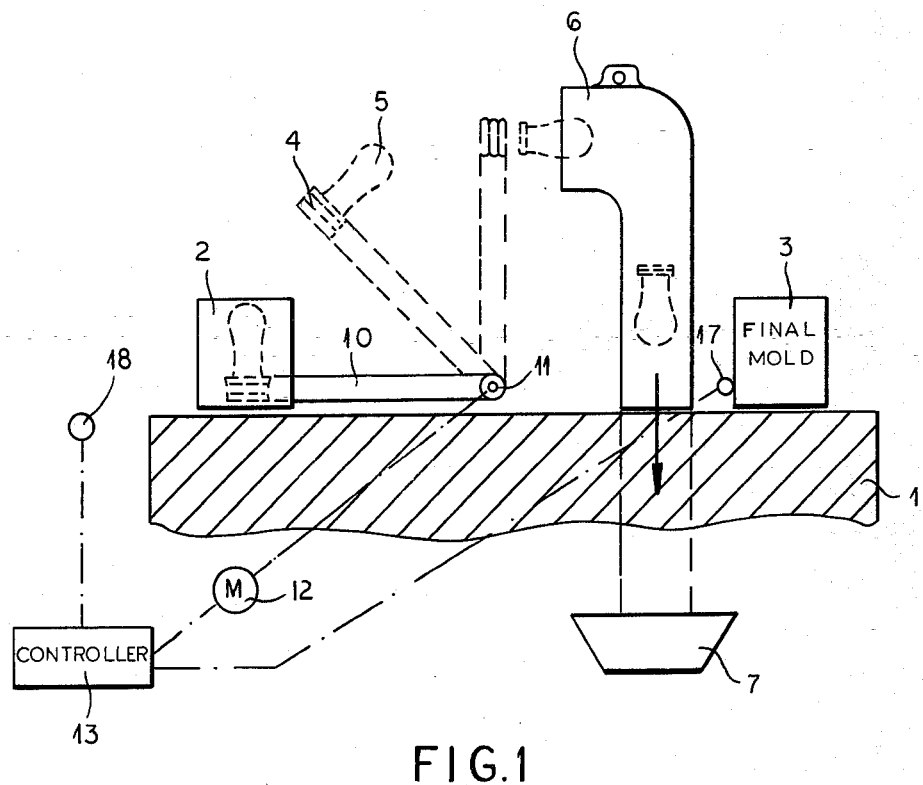
FIG. 1 is a largely schematic side view of the apparatus according to the instant invention.

As shown in the drawing a glassware-making apparatus 1 according to the instant invention has, as is well known in the art and from the above-cited commonly owned patent applications, a premold 2 and a final mold 3. The final mold 3 may be carried with one or more other final molds on a turntable 8. A gob of molten glass is molded in the premold 2 into a so-called preform or parison 5 that is blow-molded in the final mold 3 into a piece of hollow glassware.

An arm 10 pivotal about a horizontal axis 11 by a motor 12 operated by a controller 13 has an outer end provided with a clamp 4 of the neck-ring type that grips the base of the parison 5. This arm 10 normally serves to transport the parison 5 to the final mold 3. This mechanism is largely well known.

Figure 2:
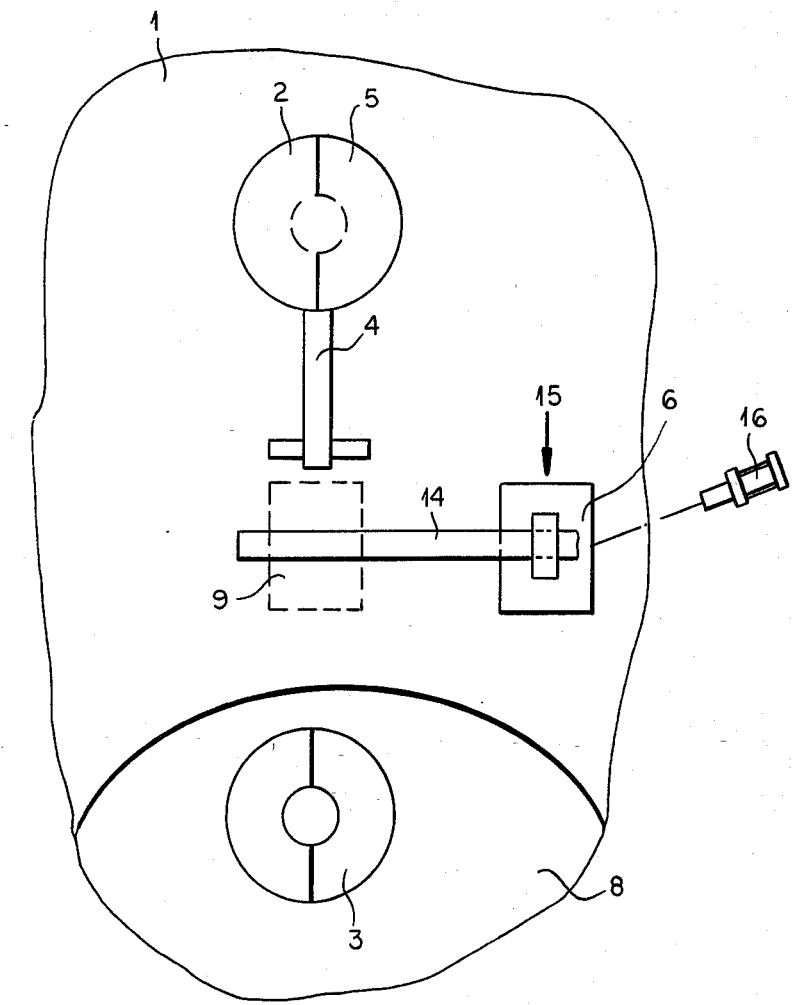
FIG. 2 is a top view of the apparatus of FIG. 1.

According to the invention an L-shaped chute 6 is displaceble along a horizontal track 14 from an out-of-the-way position indicated in FIG. 2 in solid lines at 15 to an intercept position indicated in FIG. 2 in dashed lines at 9 by means of a pneumatic or hydraulic ram 16 also operated by the controller 13. Thus chute 6 feeds down into a scrap receptacle 7.

In use whenever the controller 13 detects by means, for example, of a sensor 17 that there is something wrong at the final mold 3 or downstream therefrom, it moves the chute 6 into position 9. In addition the controller causes the motor 11 to stop the arm 10 in the vertical position of FIG. 1 and to simultaneously open the clamp 4 so that the parison 5 gripped by this clamp 4 is thrown into the horizontally opening mouth of the L-shaped chute 6. Thence the parison 5 is recycled to the upstream end of the production line.

It is also possible for the controller 13 to move the chute 6 into position at the start of a production run, as discussed above, so as to intercept the parisons produced until they are of nominal quality. Furthermore an appropriate detector 18 of the capacitance type may be provided to move the chute 6 into the intercept position 9 whenever a person approaches the machine, in order to prevent that person from being burned.

We claim:

1. An apparatus for making hollow glassware, said apparatus comprising:
   a premold adapted to make a parison;
   a final mold spaced from said premold and adapted to receive and blow-mold said parison;
   means including an arm for removing a parison from said premold and displacing the removed parison along a path through the air to said final mold; and
   means including a scrap chute displaceable into a position along said path for intercepting said parison and receiving same from said arm.

2. The apparatus defined in claim 1 wherein said arm has an outer end provided with a parison-gripping clamp of the ring type.

3. The apparatus defined in claim 2 wherein said arm is pivotal for displacing said clamp along said path.

4. The apparatus defined in claim 1, further comprising a turntable carrying said final mold.

5. The apparatus defined in claim 1, further comprising a controller connected to said arm and to said chute and including a sensor at said final mold for displacing said chute into a position intercepting said path when a disturbance is detected at said final mold.

6. The apparatus defined in claim 1, further comprising a turntable carrying said final mold.

7. A method of operating a glassware-making apparatus having:
   a premold adapted to make a parison,
   a final mold spaced from said premold and adapted to receive and blow-mold the parison,
   an arm for removing the parison from the premold in a pick-up position and displacing the parison along a path through an intermediate position to an end position at the final mold, and
   a scrap chute,
said method comprising the steps of:
   displacing said scrap chute into a position in the path between said premold and said final mold;
   arresting said arm and substantially simultaneously releasing said parison from said arm shortly before same arrives at said chute to project said parison into said chute, whereby when said final mold is not ready to receive said parison same can be intercepted by said chute.

8. The method defined in claim 7 wherein said chute is displaceable between a position out of said path and said position in said path.

9. The method defined in claim 7 wherein said path is arcuate and downwardly concave.

10. The method defined in claim 7 wherein said arm has an outer end provided with a ring-type clamp, said method further comprising the step of opening said clamp immediately before arresting said arm in said intermediate position.

* * * * *